(12) United States Patent
Reial et al.

(10) Patent No.: US 12,245,243 B2
(45) Date of Patent: Mar. 4, 2025

(54) ADAPTATION OF ACTIVE TIME PHYSICAL DOWNLINK CONTROL CHANNEL MONITORING USING BAND-WIDTH PART SWITCHING

(71) Applicant: Telefonaktiebolaget LM Ericsson (publ), Stockholm (SE)

(72) Inventors: Andres Reial, Lomma (SE); Ilmiawan Shubhi, Malmö (SE); Sina Maleki, Malmö (SE); Ali Nader, Malmö (SE); Gang Zou, Lund (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 440 days.

(21) Appl. No.: 17/620,296

(22) PCT Filed: Jun. 18, 2020

(86) PCT No.: PCT/EP2020/066905
§ 371 (c)(1),
(2) Date: Dec. 17, 2021

(87) PCT Pub. No.: WO2020/254477
PCT Pub. Date: Dec. 24, 2020

(65) Prior Publication Data
US 2022/0248447 A1    Aug. 4, 2022

Related U.S. Application Data

(60) Provisional application No. 62/863,106, filed on Jun. 18, 2019.

(51) Int. Cl.
*H04W 72/12* (2023.01)
*H04W 72/23* (2023.01)

(52) U.S. Cl.
CPC .................. *H04W 72/23* (2023.01)

(58) Field of Classification Search
CPC ...... H04W 72/23; H04L 5/001; H04L 5/0094; H04L 5/0053
USPC .................................. 370/329–330
See application file for complete search history.

(56) References Cited

U.S. PATENT DOCUMENTS

| 2019/0141742 A1 | 5/2019 | Zhou et al. |
| 2019/0166529 A1 | 5/2019 | Chen et al. |
| 2019/0357300 A1* | 11/2019 | Zhou ................ H04W 72/0453 |
| 2020/0195410 A1* | 6/2020 | Li ...................... H04W 56/001 |

(Continued)

FOREIGN PATENT DOCUMENTS

WO    2019084570 A1    5/2019

OTHER PUBLICATIONS

European Search Report dated Mar. 13, 2023, for Application No. 20733776.7, consisting of 8 pages.

(Continued)

*Primary Examiner* — Candal Elpenord
(74) *Attorney, Agent, or Firm* — Weisberg I.P. Law, P.A.

(57) ABSTRACT

A method, network node and wireless device for adaptation of search space (SS) density by bandwidth part (BWP) switching are disclosed. According to one aspect, a wireless device (WD) is configured to switch between a sparse search space (SS) configuration and a dense SS configuration, and monitor a physical downlink control channel (PDCCH) according to one of the sparse SS in a first BWP, and the dense SS in a second BWP.

18 Claims, 10 Drawing Sheets

(56) References Cited

U.S. PATENT DOCUMENTS

2021/0037558 A1* 2/2021 Xu .................. H04L 5/0053
2021/0168715 A1* 6/2021 Huang ............... H04W 24/08
2021/0235469 A1* 7/2021 Mu .................. H04L 5/0048

OTHER PUBLICATIONS

3GPP TSG RAN WG1 #97 R1-1906877; Title: PDCCH-based power saving signal/channel for UE adaptation; Agenda Item: 7.2.9.1; Source: ASUSTek; Document for: Discussion and Decision; Location and Date: Reno, USA, May 13-17, 2019, consisting of 3 pages.

International Search Report and Written Opinion dated Aug. 26, 2020 for International Application No. PCT/EP2020/066905 filed Jun. 18, 2020, consisting of 15-pages.

3GPP TSG-RAN WG1 Meeting #97 Tdoc R1-1907326; Title: PDCCH monitoring related aspects of power saving; Agenda Item: 7.2.9.3; Source: Ericsson; Document for: Discussion and Decision; Date and Location: May 13-17, 2019, Reno, USA, consisting of 5-pages.

* cited by examiner

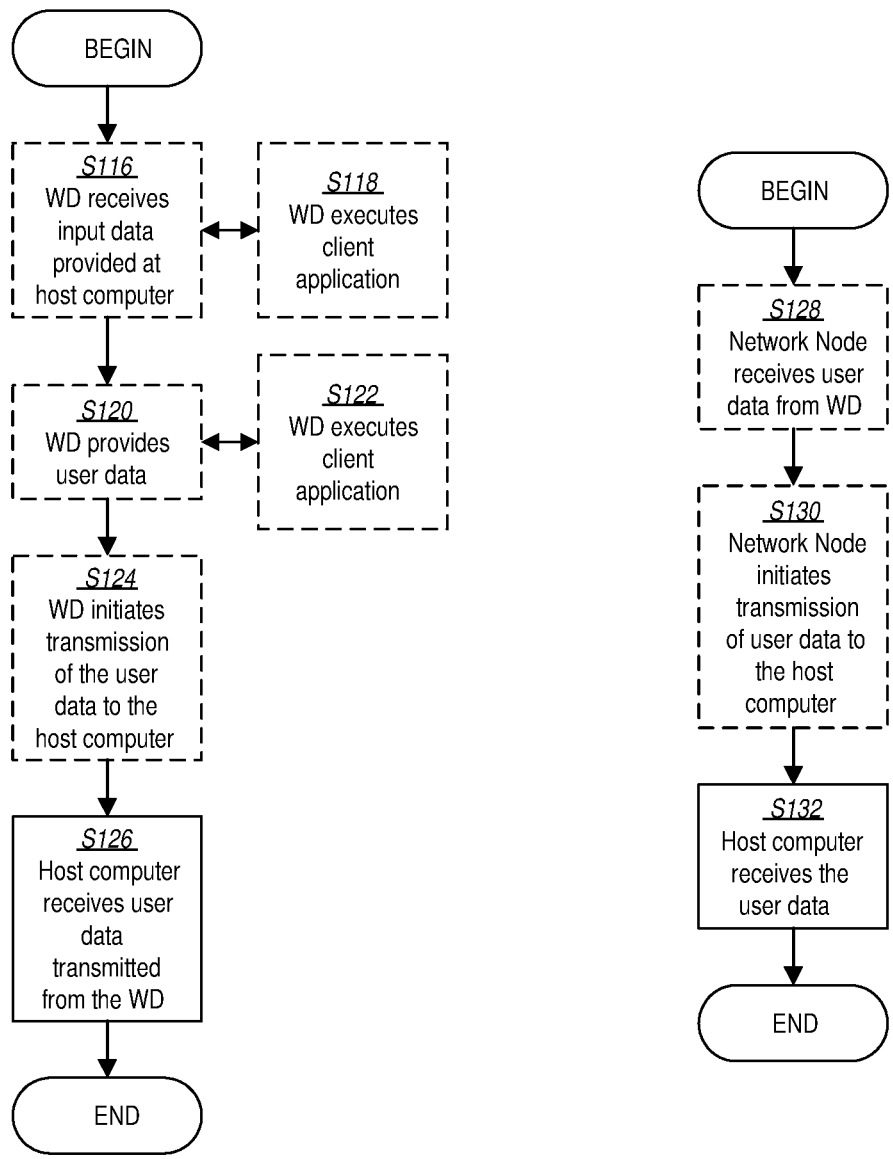

ADAPTATION OF ACTIVE TIME PHYSICAL DOWNLINK CONTROL CHANNEL MONITORING USING BAND-WIDTH PART SWITCHING

CROSS-REFERENCE TO RELATED APPLICATIONS

This application is a Submission Under 35 U.S.C. § 371 for U.S. National Stage Patent Application of International Application No.: PCT/EP2020/066905, filed Jun. 18, 2020 entitled "ADAPTATION OF ACTIVE TIME PHYSICAL DOWNLINK CONTROL CHANNEL MONITORING USING BAND-WIDTH PART SWITCHING," which claims priority to U.S. Provisional Application No. 62/863, 106, filed Jun. 18, 2019, entitled "ADAPTATION OF ACTIVE TIME PHYSICAL DOWNLINK CONTROL CHANNEL MONITORING USING BAND-WIDTH PART SWITCHING," the entireties of both of which are incorporated herein by reference.

FIELD

The present disclosure relates to wireless communications, and in particular, to adaptation of active-time physical downlink control channel (PDCCH) monitoring using band-width part (BWP) switching.

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between base stations (network nodes), and wireless devices (WD), as well as communication between network nodes and between WDs.

During an inactive time (of an inactivity timer (IAT)), when the wireless device (WD) is monitoring the physical downlink control channel (PDCCH) but no data is being scheduled, the energy consumption associated with PDCCH monitoring is a dominant contributor to the overall energy consumption of the WD.

Reducing a frequency of monitoring a search space (SS) would reduce WD energy consumption, but a straightforward modification of the PDCCH SS to reduce the duty cycle is not an acceptable option. This is because simply reducing the search space reduces the number of slots available for scheduling during an ongoing data burst and thus, the overall user throughput (UPT) is reduced. For this purpose, Radio Resource Control (RRC) reconfiguration can be adopted. However, this comes at the cost of large latency, rendering dynamic or semi-dynamic SS adaptation impossible. Thus, there is a need for a method for reducing PDCCH monitoring-related energy consumption during IAT without compromising data transmission during active data bursts with short latency.

SUMMARY

Some embodiments advantageously provide methods, network nodes and wireless devices for adaptation of active-time physical downlink control channel (PDCCH) monitoring using bandwidth part (BWP) switching. According to one aspect, a wireless device (WD) is configured by a network node with a first bandwidth part (BWP) having a dense search space (SS) configuration and a second BWP having a sparse SS configuration. The WD is further configured to receive second DCI configuring the WD to switch from the first BWP to the second BWP. The WD is also configured to switch from the first BWP to the second BWP in response to the second DCI.

In some embodiments, the network node, e.g., New Radio base station (gNB), configures the WD with two BWPs— one with dense SS (e.g., 1:1, 100% duty cycle resulting in higher energy consumption) and another with a sparse SS (e.g., 1:5, 20% duty cycle resulting in lower energy consumption due to more frequent micro-sleep opportunities). In other words, the dense SS has a duty cycle that is greater than the sparse SS. The WD is signaled to switch into the sparse BWP in the scheduling downlink control information (DCI) of the last data slot (or next to last data slot) of the ongoing data burst. Alternatively, if the sparse monitoring is configured as the default BWP, the bwp-InactivityTimer might be used for the transition. The WD is signaled to switch into the dense BWP in the first scheduling DCI of a new data burst.

The duty cycle of the sparse SS may be determined based on acceptable (to the service provider/developer/etc.) data delay information from the WD or by knowledge of current traffic types (Quality of Service (QoS)). If a WD-specific switching delay (capability, release) is imposed at each BWP switch, then the duty cycle of the sparse SS is chosen so that the aggregate delay of the SS gap and the switching delay does not exceed the acceptable data delay. The WD may signal the acceptable data delay for next data burst via WD assistance signaling.

Embodiments may be applied in the Third Generation Partnership Project (3GPP) Technical Release 15 (Rel-15). Efficiency may be further improved if the BWP switching delay is reduced in future 3GPP releases.

According to one aspect, a network node is configured to communicate with a wireless device (WD). The network node includes processing circuitry configured to determine a sparse search space, SS, configuration of the WD to monitor a physical downlink control channel, PDCCH, in a sparse SS in a first bandwidth part, BWP, determine a dense SS configuration of the WD to monitor the PDCCH in a dense SS in a second BWP, and select one of the determined sparse SS configuration and the determined dense SS configuration. The network node also includes a radio interface in communication with the processing circuitry. The radio interface is configured to transmit to the WD an indication of the selected SS configuration to be configured by the WD.

According to this aspect, in some embodiments, when the indication indicates the sparse SS and first BWP, the indication is transmitted in downlink control information, DCI, during one of a last data slot and a next to last data slot of a data burst. In some embodiments, when the indication indicates the dense SS and second BWP, the indication is transmitted in a first scheduling downlink control information, DCI, of a next data burst. In some embodiments, the radio interface is further configured to receive a data delay indication from the WD, the data delay indication indicating a delay that is acceptable to the WD, and wherein a duty cycle of the sparse SS is based at least in part on the indicated data delay. In some embodiments, the duty cycle of the sparse SS is determined so that an aggregate time of switching between a dense and sparse SS and a gap between polling the PDCCH by the WD does not exceed the indicated data delay. In some embodiments, a duty cycle of the sparse SS is based at least in part on a quality of service, QoS, to be provided to the WD by the network node. In some embodiments, the indication is transmitted by radio resource control, RRC, reconfiguration signaling. In some embodiments, a bandwidth, center frequency and number of layers of transmission by the network node to the WD remain unchanged by a change in search space configuration of the WD. In some embodiments, the sparse SS and the dense SS overlap. In some embodiments, the dense SS configuration is determined based at least in part on network resource usage. In some embodiments, the radio interface is further configured to transmit to the WD an indication to reconfigure a SS configuration responsive to expiry of a timer.

According to another aspect, a method in a network node configured to communicate with a wireless device (WD) is provided. The method includes: determining a sparse search space, SS, configuration of the WD to monitor a physical downlink control channel, PDCCH, in a sparse SS in a first bandwidth part, BWP; determining a dense SS configuration of the WD to monitor the PDCCH in a dense SS in a second BWP; selecting one of the determined sparse SS configuration and the determined dense SS configuration; and transmitting to the WD an indication of the selected SS configuration to be configured by the WD.

According to this aspect, in some embodiments, when the indication indicates the sparse SS and first BWP, the indication is transmitted in downlink control information, DCI, during one of a last data slot and a next to last data slot of a data burst. In some embodiments, when the indication indicates the dense SS and second BWP, the indication is transmitted in a first scheduling downlink control information, DCI, of a next data burst. In some embodiments, the method further includes receiving a data delay indication from the WD, the data delay indication indicating a data delay that is acceptable to the WD, and wherein a duty cycle of the sparse SS is based at least in part on the indicated data delay. In some embodiments, the duty cycle of the sparse SS is determined so that an aggregate time of switching between a dense and sparse SS and a gap between polling the PDCCH by the WD does not exceed the indicated data delay. In some embodiments, a duty cycle of the sparse SS is based at least in part on a quality of service, QoS, to be provided to the WD by the network node. In some embodiments, the indication is transmitted by radio resource control, RRC, reconfiguration signaling. In some embodiments, a bandwidth, center frequency and number of layers of transmission by the network node to the WD remain unchanged by a change in search space configuration of the WD. In some embodiments, the sparse SS and the dense SS overlap. In some embodiments, the dense SS configuration is determined based at least in part on network resource usage. In some embodiments, the radio interface is further configured to transmit to the WD an indication to reconfigure a SS configuration responsive to expiry of a timer.

According to yet another aspect, a wireless device (WD) is configured to communicate with a network node. The WD includes processing circuitry configured to switch between a sparse search space, SS, configuration and a dense SS configuration, and monitor a physical downlink control channel, PDCCH, according to one of the sparse SS in a first bandwidth part, BWP, and the dense SS in a second BWP.

According to this aspect, in some embodiments, the switching is responsive to an indication of SS configuration received from the network node. In some embodiments, the switching is responsive to expiry of a timer. In some embodiments, when the WD is in the sparse SS configuration, the WD enters a sleep mode, a duration of sleep in the sleep mode being based on a gap between SS search occasions. In some embodiments, a level of sleep of the sleep mode is based on a frequency of SS search occasions. In some embodiments, the processing circuitry is further configured to determine with a specified reliability when a downlink control information, DCI, indicating a BWP change is missed, and to switch between a sparse SS and a dense SS when the DCI indicating a BWP change is determined to be missed. In some embodiments, switching to the sparse SS with first BWP is responsive to not receiving a scheduling PDCCH for a duration of time that exceeds a threshold.

According to another aspect, a method in a wireless device, WD, configured to communicate with a network node is provided. The method includes switching between a sparse search space, SS, configuration and a dense SS configuration, and monitoring a physical downlink control channel, PDCCH, according to one of the sparse SS in a first bandwidth part, BWP, and the dense SS in a second BWP.

According to this aspect, in some embodiments, the switching is responsive to an indication of SS configuration received from the network node. In some embodiments, the switching is responsive to expiry of a timer. In some embodiments, when the WD is in the sparse SS configuration, the WD enters a sleep mode, a duration of sleep in the sleep mode being based on a gap between SS search occasions. In some embodiments, a level of sleep of the sleep mode is based on a frequency of SS search occasions. In some embodiments, the method further includes determining with a specified reliability when a downlink control information, DCI, indicating a BWP change is missed, and to switch between a sparse SS and a dense SS when the DCI indicating a BWP change is determined to be missed. In some embodiments, switching to the sparse SS with first BWP is responsive to not receiving a scheduling PDCCH for a duration of time that exceeds a threshold.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 5 is a flowchart illustrating exemplary methods implemented in a communication system including a host computer, a network node and a wireless device for receiving user data from the wireless device at a host computer according to some embodiments of the present disclosure;

FIG. 6 is a flowchart illustrating exemplary methods implemented in a communication system including a host computer, a network node and a wireless device for receiving user data at a host computer according to some embodiments of the present disclosure;

DETAILED DESCRIPTION

Figure 1:
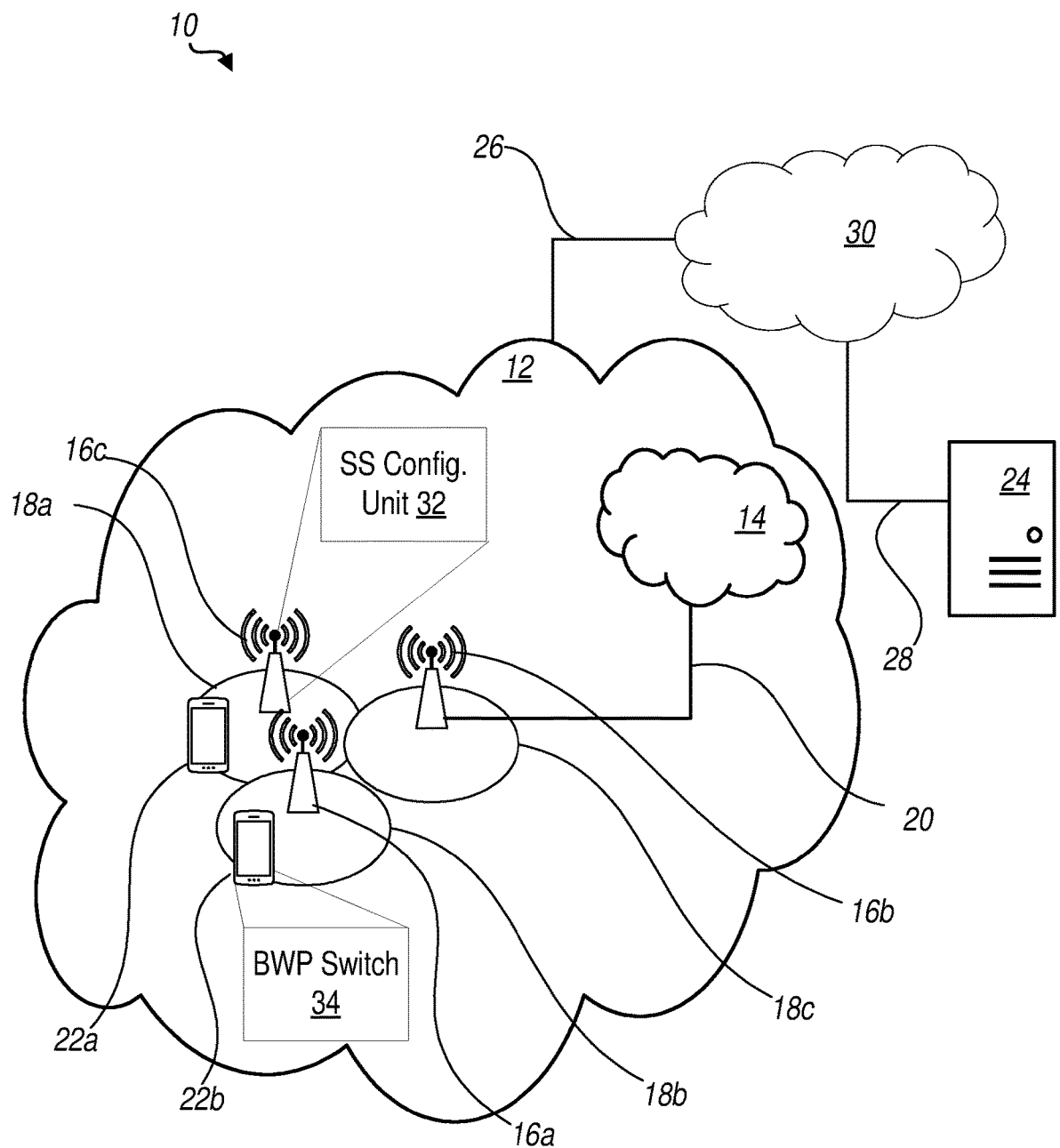
FIG. 1 is a schematic diagram of an exemplary network architecture illustrating a communication system connected via an intermediate network to a host computer according to the principles in the present disclosure.

Before describing in detail exemplary embodiments, it is noted that the embodiments reside primarily in combinations of apparatus components and processing steps related to adaptation of active-time physical downlink control channel (PDCCH) monitoring using bandwidth part (BWP) switching. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide for adaptation of active-time physical downlink control channel (PDCCH) monitoring using bandwidth part (BWP) switching. According to one aspect, a wireless device (WD) is configured to receive first downlink control information, DCI, from the network node configuring the WD with a first bandwidth part (BWP) having a dense search space (SS) configuration and a second BWP having a sparse SS configuration. The WD is further configured to receive second DCI configuring the WD to switch from the first BWP to the second BWP. The WD is also configured to switch from the first BWP to the second BWP in response to the second DCI.

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a SS configuration unit 32 which is configured to determine dense and sparse SS configurations. A wireless device 22 is configured to include a BWP switch 34 which is configured to switch between first and second BWPs.

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include a xxx unit 54 configured to enable the service provider to [observe/monitor/control/transmit to/receive from . . . the network node 16 and or the wireless device 22.] The processing circuitry 42 of the host computer 24 may also include a xxx unit 56 configured to enable the service provider to [observe/monitor/control/transmit to/receive from . . . the network node 16 and or the wireless device 22.]

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include SS configuration unit 32 configured to determine dense and sparse SS configurations.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a BWP switch 34 configured to switch between first and second BWPs.

Figure 2:
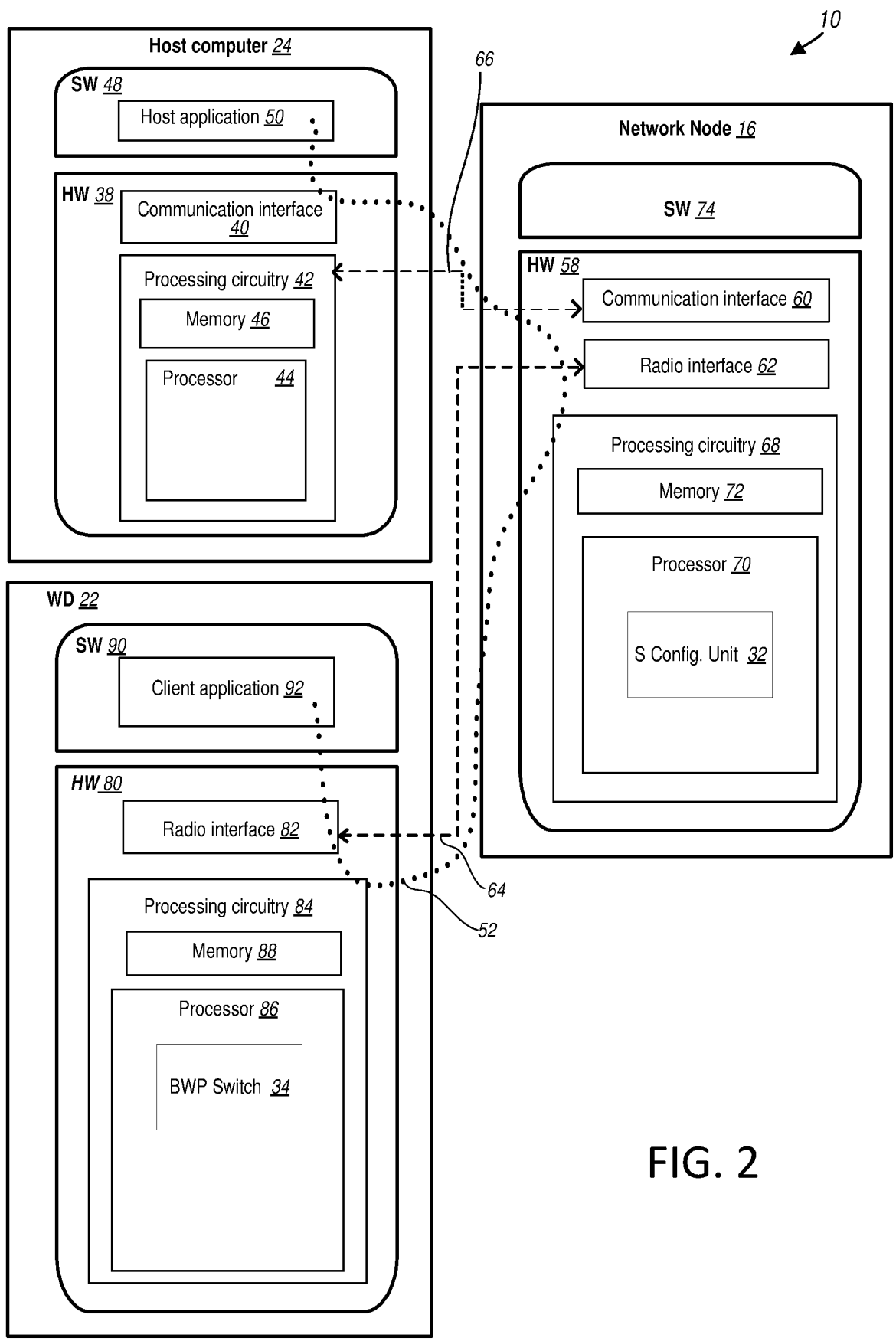
FIG. 2 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as SS configuration unit 32, and BWP switch 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 3, 4:
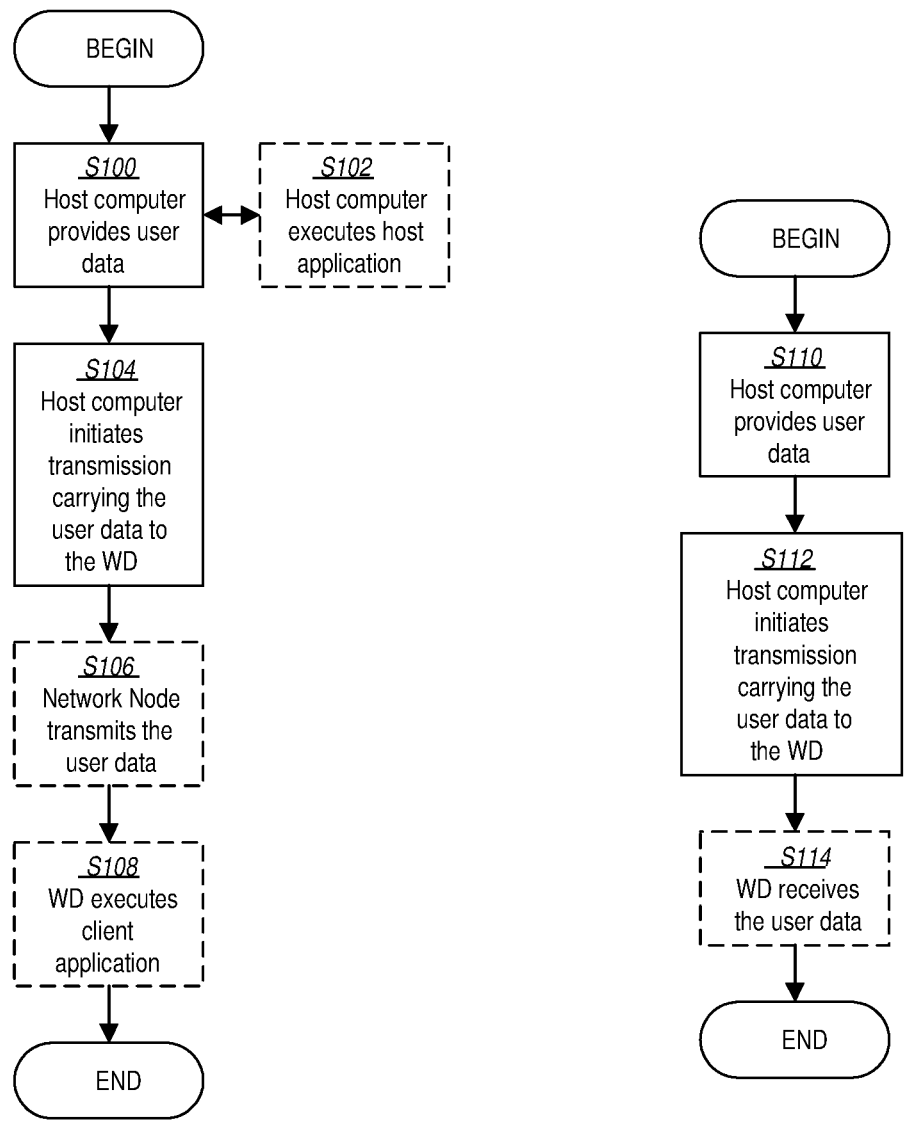
FIG. 3 is a flowchart illustrating exemplary methods implemented in a communication system including a host computer, a network node and a wireless device for executing a client application at a wireless device according to some embodiments of the present disclosure.
FIG. 4 is a flowchart illustrating exemplary methods implemented in a communication system including a host computer, a network node and a wireless device for receiving user data at a wireless device according to some embodiments of the present disclosure.

FIG. 3 is a flowchart illustrating an exemplary method implemented in a communication system, such as, for example, the communication system of FIGS. 1 and 2, in accordance with one embodiment. The communication system may include a host computer 24, a network node 16 and a WD 22, which may be those described with reference to FIG. 2. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 4 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

FIG. 5 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally, or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 6 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 7:
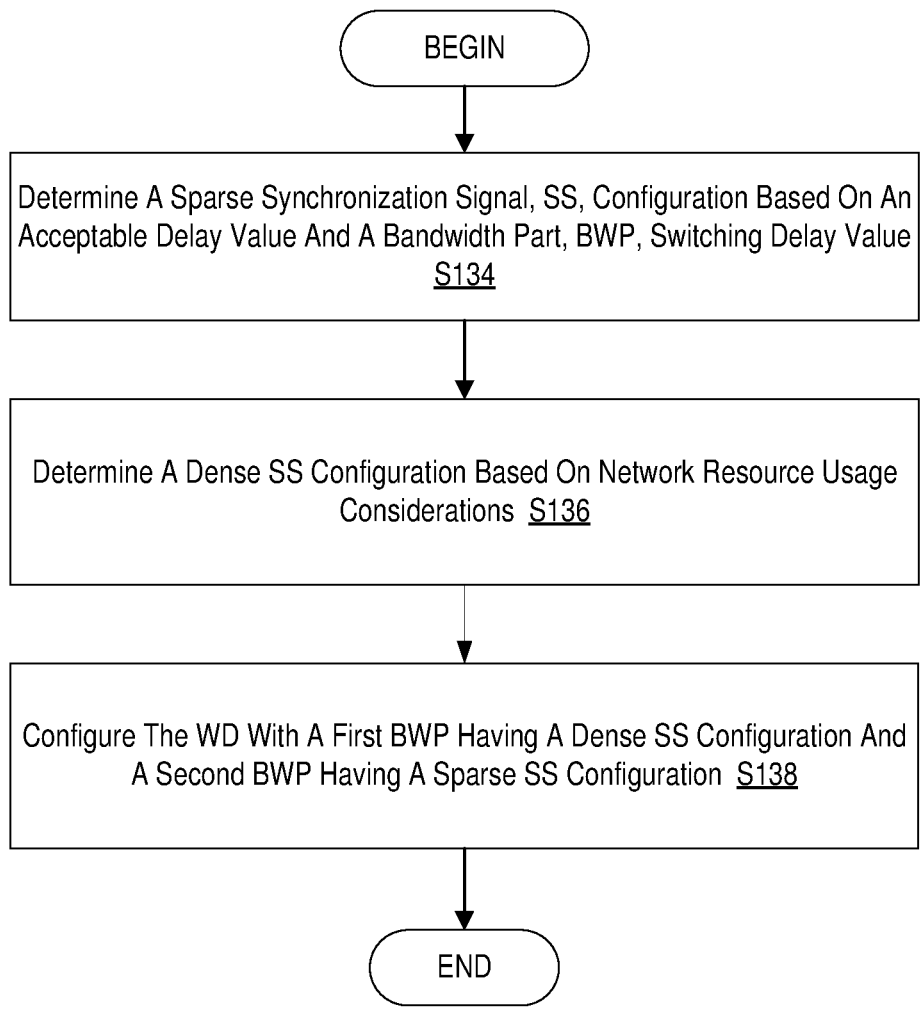
FIG. 7 is a flowchart of an exemplary process in a network node for adaptation of search space (SS) density by bandwidth part (BWP) according to some embodiments of the present disclosure.

FIG. 7 is a flowchart of an example process in a network node 16 for adaptation of SS density by BWP switching. One or more blocks described herein may be performed by one or more elements of network node 16 such as by one or more of processing circuitry 68 (including the SS configuration unit 32), processor 70, radio interface 62 and/or communication interface 60. Network node 16 such as via processing circuitry 68 and/or processor 70 and/or radio interface 62 and/or communication interface 60 is configured to determine a sparse search space, SS, configuration based on an acceptable delay value and a bandwidth part, BWP, switching delay value (Block S134). The process includes determining a dense SS configuration based on network resource usage considerations (Block S136). The process further includes configuring the WD with a first BWP having a dense SS configuration and a second BWP having a sparse SS configuration (Block S138).

Figure 8:
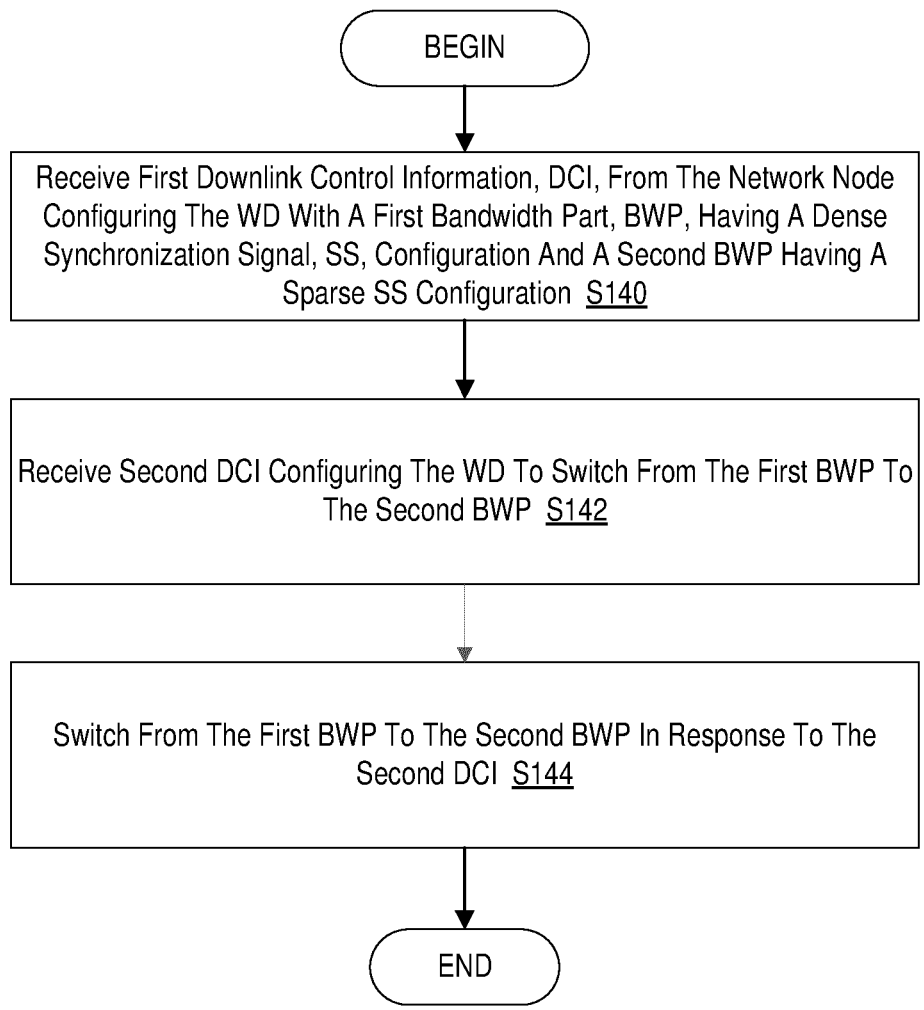
FIG. 8 is a flowchart of an exemplary process in a wireless device for adaptation of search space (SS) density by bandwidth part (BWP) according to some embodiments of the present disclosure

FIG. 8 is a flowchart of an example process in a wireless device 22 according to some embodiments of the present disclosure One or more blocks described herein may be performed by one or more elements of wireless device 22 such as by one or more of processing circuitry 84 (including the BWP switch 34), processor 86, radio interface 82 and/or communication interface 60. Wireless device 22 such as via processing circuitry 84 and/or processor 86 and/or radio interface 82 is configured to receive first downlink control information, DCI, from the network node configuring the WD with a first bandwidth part, BWP, having a dense search space, SS, configuration and a second BWP having a sparse SS configuration (Block S140). The process includes receiving second DCI configuring the WD to switch from the first BWP to the second BWP (Block S142). The process further includes switching from the first BWP to the second BWP in response to the second DCI (Block S144).

Figure 9:
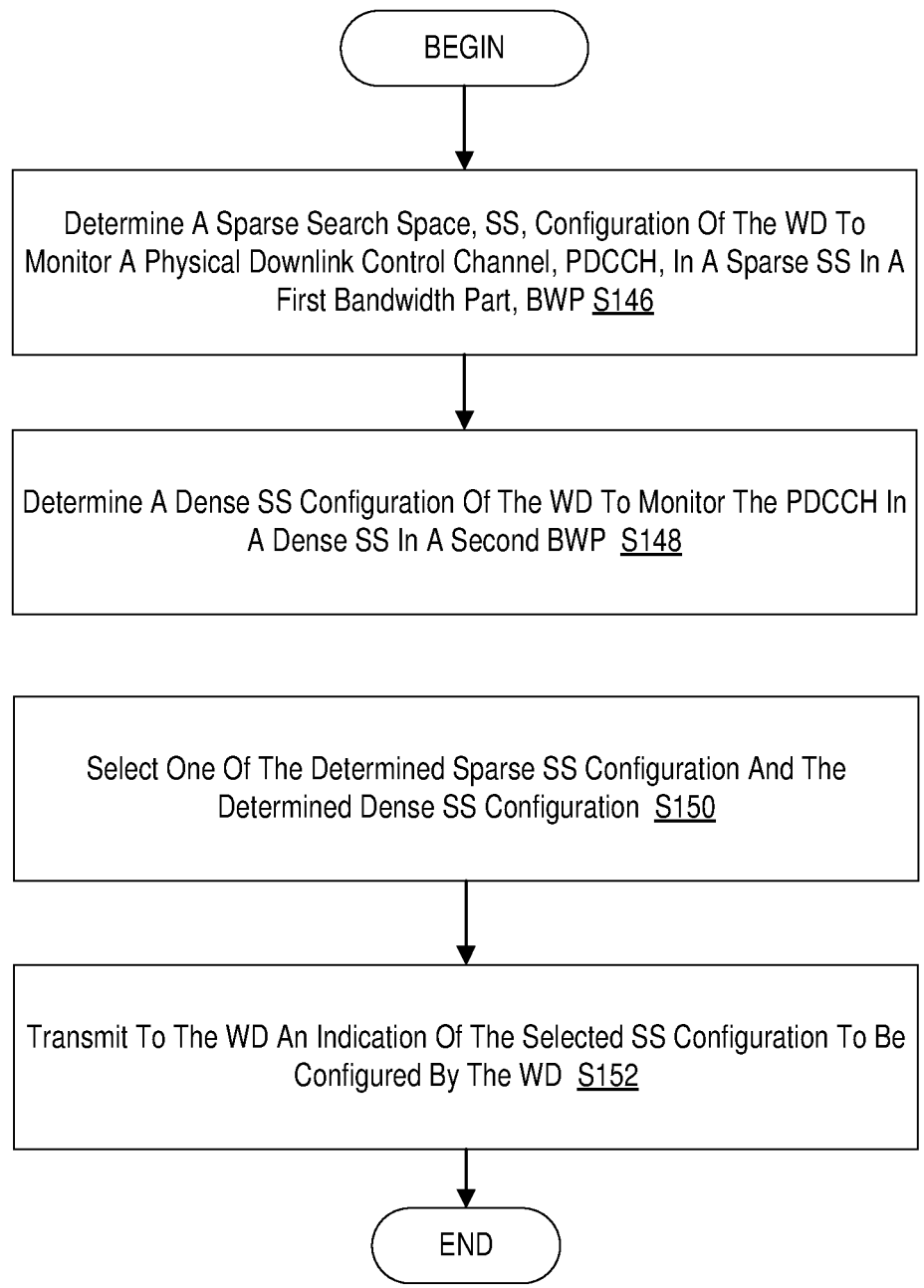
FIG. 9 is a flowchart of an alternative process in a network node for adaptation of search space density.

FIG. 9 is a flowchart of an alternative process in a network node 16 for adaptation of SS density by BWP switching. One or more blocks described herein may be performed by one or more elements of network node 16 such as by one or more of processing circuitry 68 (including the SS configuration unit 32), processor 70, radio interface 62 and/or communication interface 60. Network node 16 such as via processing circuitry 68 and/or processor 70 and/or radio interface 62 and/or communication interface 60 is configured to determine a sparse search space, SS, configuration of the WD 22 to monitor a physical downlink control channel, PDCCH, in a sparse SS in a first bandwidth part, BWP (Block S146). The process further includes determining a dense SS configuration of the WD 22 to monitor the PDCCH in a dense SS in a second BWP (Block S148). The process also includes selecting one of the determined sparse SS configuration and the determined dense SS configuration (Block S150). The process further includes transmitting to the WD 22 an indication of the selected SS configuration to be configured by the WD 22 (Block S152).

Figure 10:
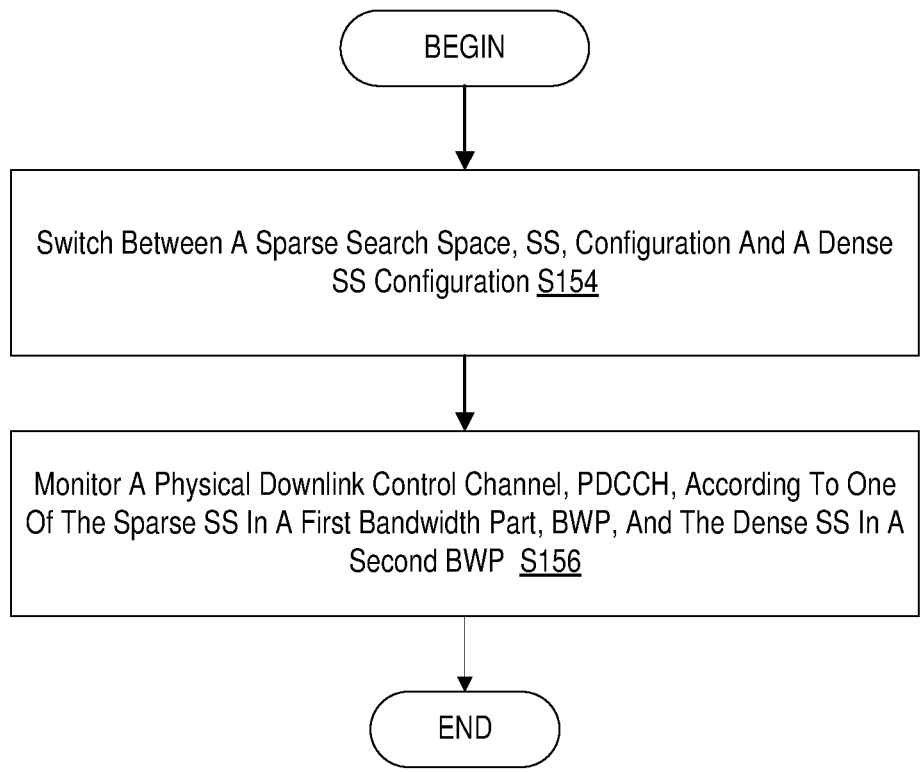
FIG. 10 is a flowchart of an alternative process in a WD for adaptation of search space density.

FIG. 10 is a flowchart of an alternative process in a wireless device 22 according to some embodiments of the present disclosure One or more blocks described herein may be performed by one or more elements of wireless device 22 such as by one or more of processing circuitry 84 (including the BWP switch 34), processor 86, radio interface 82 and/or communication interface 60. Wireless device 22 such as via processing circuitry 84 and/or processor 86 and/or radio interface 82 is configured to switch between a sparse search space, SS, configuration and a dense SS configuration (Block S154). The process also includes monitoring a physical downlink control channel, PDCCH, according to one of the sparse SS in a first bandwidth part, BWP, and the dense SS in a second BWP (Block S156)

Having described the general process flow of arrangements of the disclosure and having provided examples of hardware and software arrangements for implementing the processes and functions of the disclosure, the sections below provide details and examples of arrangements for adaptation of active-time physical downlink control channel (PDCCH) monitoring using bandwidth part (BWP) switching.

Some embodiments utilize the 3GPP Rel-15 BWP switching mechanism for SS adaptation for scheduling PDCCH monitoring during the active time of the IAT.

In some embodiments, the network node 16 (e.g., gNB) configures the WD 22 with at least two BWPs—one with dense SS and another with a sparse SS. The WD 22 is signaled to switch to the sparse BWP in the scheduling DCI of the last data slot (or next to last) of the ongoing data burst. The WD 22 is signaled to switch into the dense BWP in the first scheduling DCI of a new data burst.

Figure 11:
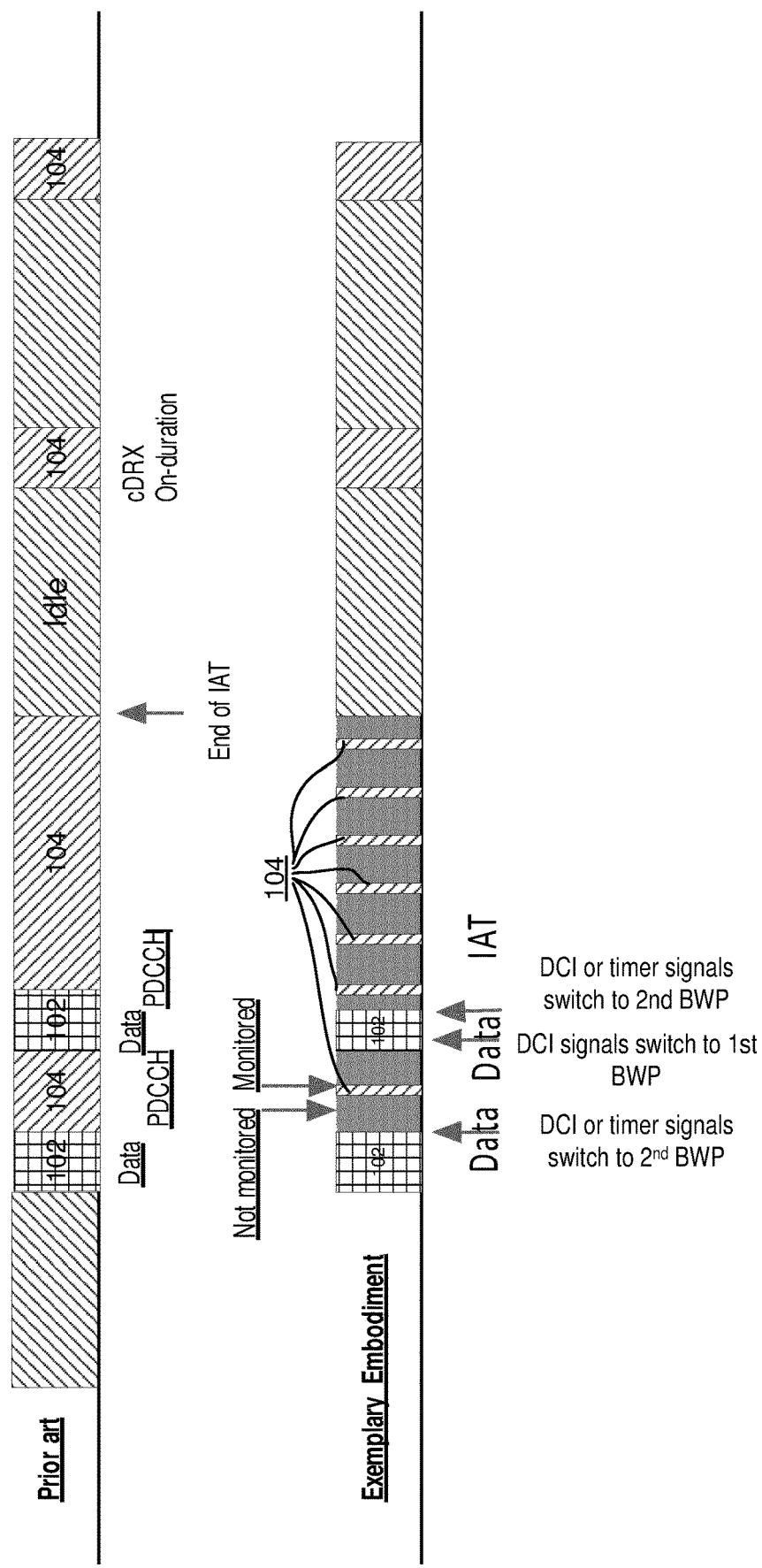
FIG. 11 is a timing diagram showing the prior art compared to one embodiment disclosed herein.

PDCCH monitoring patterns according to some embodiments are depicted in FIG. 11. At the top of FIG. 11 is a timeline where data 102 is separated by, and followed by, PDCCH transmissions 104. In this known timeline, the PDCCH is monitored at 100% duty cycle. One example timeline according to principles set forth herein is shown in the bottom of FIG. 11. In this timeline, the PDCCH is monitored infrequently compared to monitoring at 100% duty cycle. For example, PDCCH monitoring may only occur with a 20% duty cycle.

Figure 12:
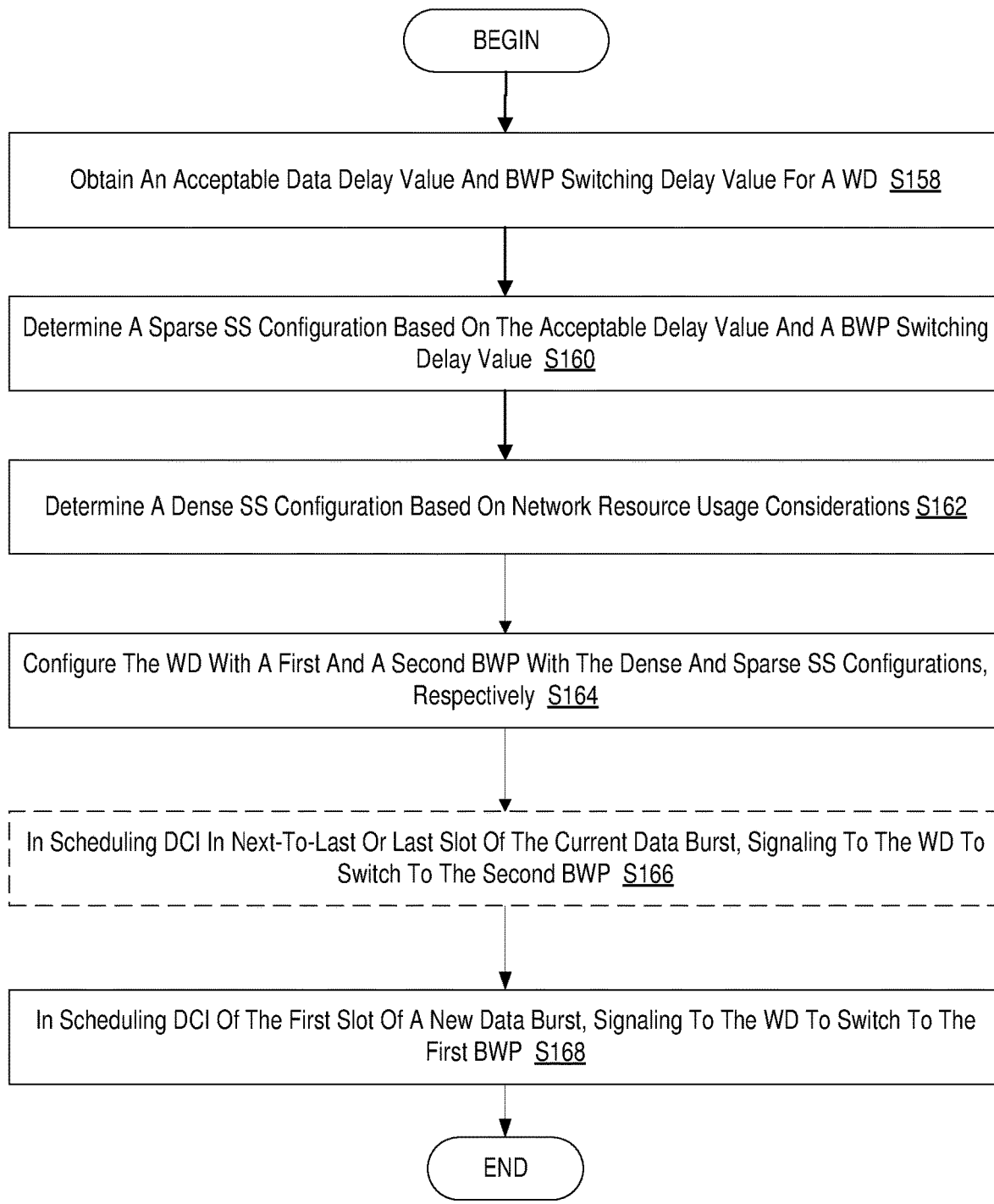
FIG. 12 is a flowchart of an example embodiment of determining and configuring sparse and dense search spaces with BWP switching.

With reference to FIG. 12, in some embodiments, methods are provided that may include the following:

S158 Obtain an acceptable data delay value and BWP switching delay value for a WD 22;

S160 Determine a sparse SS configuration based on the acceptable delay value and a BWP switching delay value;

S162 Determine a dense SS configuration based on network resource usage considerations;

S164 Configure the WD 22 with a first and a second BWP with the dense and sparse SS configurations, respectively;

S166 (Optional) In scheduling DCI in next-to-last or last slot of the current data burst, signaling to the WD 22 to switch to the second BWP; and S168 In scheduling DCI of the first slot of a new data burst, signaling to the WD 22 to switch to the first BWP.

In step S158, the network obtains an acceptable data delay value and BWP switching delay value for the. WD 22. The WD 22 may signal the acceptable data delay for next data during active time burst via WD 22 assistance signaling. The WD's acceptable latency can be communicated on a longer time scale using RRC or more often through uplink control information (UCI) (over the physical uplink control channel or physical uplink shared channel (PUCCH or PUSCH), or media access control (MAC) control element (CE). Alternatively, or additionally, the network (NW) may use the knowledge of current traffic types (e.g., QoS).

The network, such as via network node 16, may derive the BWP switching delay from WD 22 capability signaling or update via RRC or based on an agreed BWP change pattern with specific WDs. For example, the network, such as via network node 16, may define the exact BWP as BWP1 and BWP 2, and thus, a DCI BWP change indication may simply refer to a new configuration. The WD 22 can implement this much faster than a regular BWP change, e.g., a maximum one slot delay. In another approach, the network may look at the WD's data buffer (DL buffer as well as a buffer status report (BSR) for the uplink (UL)), as well as the scheduling buffer to determine possible scheduling gaps and decide whether the delays are acceptable delays (as established by the network provider, designer, etc.).

In step S160, the network, such as via network node 16, may determine a sparse SS configuration based on the acceptable delay value and a BWP switching delay value. Extension to multiple SS configurations per BWP is straightforward given the disclosure herein. The duty cycle of the sparse SS may be determined based on acceptable data delay information from the WD 22 or by knowledge of current traffic types (e.g., which may be distinguished based on Quality of Service (QoS)) as described above. A WD-specific switching delay may be derived based on, for example, WD 22 capability (such as type 1 or type 2 switching) and WD 22 release (for example, 3GPP Rel-15 or later) may be imposed at each BWP switch. Then, the duty cycle of the sparse SS may be chosen so that the aggregate delay of the SS gap and the switching delay does not exceed the acceptable data delay. The number of slots monitored during each SS period may be as low as 1, or it may be higher to provide additional scheduler flexibility. In the latter case, the period may be adjusted accordingly to achieve the desired duty cycle, or a higher duty cycle may be accepted in order not to violate the acceptable delay constraint.

In step S162, the network, such as via network node 16, may determine a dense SS configuration based on network preferences. For example, to maximize network and user transmission power, (TP), a SS configuration may be chosen with 100% duty cycle, monitoring every slot or even denser if needed.

In step S164, the network, such as via network node 16, may configure the WD 22 with a first (non-PS) and a second (PS) BWP, with the dense and sparse SS configurations, respectively. Extension to multiple PS BWPs is also possible and straightforward given the disclosure herein. The configuration of the WD 22 may be performed via radio resource control (RRC) reconfiguration signaling. While not excluded, some embodiments do not require introducing any additional differences between the BWP configurations except the SS related configuration. In particular, the bandwidth (BW) and frequency locations, and the number of multiple input multiple output (MIMO) layers of both BWPs, can be the same. As such, the BWP switching delay is reduced significantly, and the WD 22 may be configured to only update its SS configuration upon reception and decoding of BWP change DCI.

In step S166, in the next-to-last or last slot of the current data burst, or otherwise near the end of the current data burst, the scheduling DCI may be used to signal the WD 22 to switch to the second BWP by setting the appropriate bits in the BWP field in the DCI. As a result, the WD 22 will switch to the sparse SS monitoring mode after the end of the data burst. Nevertheless, this does not exclude alternative cases where the network would like to change the active BWP in either direction.

Step S166 is optional. Instead of explicit signaling to switch to the sparse BWP, the WD 22 may be configured to switch to the sparse BWP based on a time expiry according to Rel-15 procedures. The network node 16 can configure the second BWP as the default BWP and configure the first BWP with a "short" timer setting to switch to the second BWP after the end of the current data burst.

In step S168, in the first slot of the next data burst or otherwise near the beginning of the next data burst such as the second or third slot of the next data burst, the scheduling DCI can be used to signal to the WD 22 to switch to the first BWP by setting the appropriate bits in the BWP field in the DCI. As a result, the WD 22 will switch to the dense SS monitoring mode near the beginning of the data burst. As in Step 164, alternative cases can also be implemented if the network wishes to change the BWP in either direction, i.e., from dense to sparse or vice-versa.

Sub-Embodiment 1: Rapid BWP Change Implementation

In some embodiments, the network, such as via network node 16, may configure the WD 22 with the two BWPs (or more if necessary or desired) with the same bandwidth (BW) and central frequency. In an alternative option, a smaller BW can be used for one of the two BWPs, leaving the central frequency and number of MIMO layers the same. Or the difference between the two BWPs can be only the SS scheduling parameter. Nevertheless, the network may have separate configurations for each BWP, e.g., different SS configurations in some embodiments. As such, the HW related delay of a BWP change is virtually negligible. In some embodiments, it is assumed that the BW and central frequency of BWP 1 and BWP 2 and all the other related configurations are the same except the SS configuration, e.g., SS monitoring periodicity. Therefore, as soon as the WD 22 receives a BWP change DCI, the related delay reduces the time needed for decoding the DCI (an even faster BWP change indication may also be possible, e.g., one core resource set (CORESET) may indicate a BWP change, or a specific SS, or radio network temporary identifier (RNTI), etc.).

Sub-Embodiment 2: WD Behavior Upon Reception of BWP Based SS Adaptation to Sparse Mode Upon reception of a DCI indication of a BWP change with a different SS, the WD 22 first may need to decode the related DCI, and then apply the BWP change with a 3GPP Rel-15-indicated delay or possibly different delays known to the network node 16. In case the WD 22 is moved to the PS BWP, i.e., with sparser SS configuration, then depending on the time span between the two SS occasions, and if the WD 22 is not scheduled in between, the WD 22 may choose to go to sleep. The type of sleep including micro, light or deep sleep depends on the available sleep time, as well as specific WD 22 implementation of the sleep mode.

Extensions

If there is a false alarm or misdetection regarding the DCI including the BWP change, a misalignment between the WD 22 and the network node 16 is possible. For example, the network node 16 may want to move the WD 22 to the dense SS mode, but if the WD 22 misses the related DCI, it will remain in the sparse SS mode, thereby potentially missing a number of scheduling PDCCHs. Thus, there may be a cost for the network node 16 and WD 22 in terms of latency, throughput and even power consumption. In one approach, the network node 16 can make sure that both SS configurations are overlapping. Thus, if the WD 22 misses a SS configuration change, then the network node 16 can find the WD 22 in another SS occasion, particularly if the WD 22 misses the DCI, thereby indicating a move to the BWP with the dense SS mode. The WD 22 can also automatically move to the dense/sparse SS mode, if it can determine with a high reliability that a BWP change DCI is missed. For example, the WD 22 may learn that the network node 16 always sends the WD 22 to the dense SS mode as soon as something needs to be scheduled, and thus can automatically move to the BWP with the dense SS configuration. Alternatively, it may not receive any scheduling PDCCH for some time after the last scheduling DCI and may move to the BWP with sparse SS, assuming with high reliability that it has missed the BWP change DCI to move to the relevant BWP if the network always triggers the WD 22 as such.

According to one aspect, a network node 16 is configured to communicate with a wireless device (WD). The network node 16 includes processing circuitry 68 configured to determine a sparse search space, SS, configuration of the WD 22 to monitor a physical downlink control channel, PDCCH, in a sparse SS in a first bandwidth part, BWP, determine a dense SS configuration of the WD 22 to monitor the PDCCH in a dense SS in a second BWP, and select one of the determined sparse SS configuration and the determined dense SS configuration. The network node 16 also includes a radio interface 62 in communication with the processing circuitry. The radio interface 62 is configured to transmit to the WD 22 an indication of the selected SS configuration to be configured by the WD 22.

According to this aspect, in some embodiments, when the indication indicates the sparse SS and first BWP, the indication is transmitted in downlink control information, DCI, during one of a last data slot and a next to last data slot of a data burst. In some embodiments, when the indication indicates the dense SS and second BWP, the indication is transmitted in a first scheduling downlink control information, DCI, of a next data burst. In some embodiments, the radio interface 62 is further configured to receive a data delay indication from the WD 22, the data delay indication indicating a delay that is acceptable to the WD 22, and wherein a duty cycle of the sparse SS is based at least in part on the indicated data delay. In some embodiments, the duty cycle of the sparse SS is determined so that an aggregate time of switching between a dense and sparse SS and a gap between polling the PDCCH by the WD 22 does not exceed the indicated data delay. In some embodiments, a duty cycle of the sparse SS is based at least in part on a quality of service, QoS, to be provided to the WD 22 by the network node 16. In some embodiments, the indication is transmitted by radio resource control, RRC, reconfiguration signaling via the radio interface 62. In some embodiments, a bandwidth, center frequency and number of layers of transmission by the network node 16 to the WD 22 remain unchanged by a change in search space configuration of the WD 22. In some embodiments, the sparse SS and the dense SS overlap. In some embodiments, the dense SS configuration is determined based at least in part on network resource usage. In some embodiments, the radio interface 62 is further configured to transmit to the WD 22 an indication to reconfigure a SS configuration responsive to expiry of a timer.

According to another aspect, a method in a network node 16 configured to communicate with a wireless device (WD) is provided. The method includes: determining, via the processing circuitry 68, a sparse search space, SS, configuration of the WD 22 to monitor a physical downlink control channel, PDCCH, in a sparse SS in a first bandwidth part, BWP; determining, via the processing circuitry 68, a dense SS configuration of the WD 22 to monitor the PDCCH in a dense SS in a second BWP; selecting one of the determined sparse SS configuration and the determined dense SS configuration; and transmitting, via the radio interface 62, to the WD 22 an indication of the selected SS configuration to be configured by the WD 22.

According to this aspect, in some embodiments, when the indication indicates the sparse SS and first BWP, the indication is transmitted via the radio interface 62 in downlink control information, DCI, during one of a last data slot and a next to last data slot of a data burst. In some embodiments, when the indication indicates the dense SS and second BWP, the indication is transmitted via the radio interface 62 in a first scheduling downlink control information, DCI, of a next data burst. In some embodiments, the method further includes receiving via the radio interface 62 a data delay indication from the WD 22, the data delay indication indicating a data delay that is acceptable to the WD 22, and wherein a duty cycle of the sparse SS is based at least in part on the indicated data delay. In some embodiments, the duty cycle of the sparse SS is determined via the processing circuitry 68 so that an aggregate time of switching between a dense and sparse SS and a gap between polling the PDCCH by the WD 22 does not exceed the indicated data delay. In some embodiments, a duty cycle of the sparse SS is based at least in part on a quality of service, QoS, to be provided to the WD 22 by the network node 16. In some embodiments, the indication is transmitted by radio resource control, RRC, reconfiguration signaling via the radio interface 62. In some embodiments, a bandwidth, center frequency and number of layers of transmission by the network node 16 to the WD 22 remain unchanged by a change in search space configuration of the WD 22. In some embodiments, the sparse SS and the dense SS overlap. In some embodiments, the dense SS configuration is determined based at least in part on network resource usage. In some embodiments, the radio interface 62 is further configured to transmit to the WD 22 an indication to reconfigure a SS configuration responsive to expiry of a timer.

According to yet another aspect, a wireless device (WD) is configured to communicate with a network node 16. The WD 22 includes processing circuitry 84 configured to switch between a sparse search space, SS, configuration and a dense SS configuration, and monitor a physical downlink control channel, PDCCH, according to one of the sparse SS in a first bandwidth part, BWP, and the dense SS in a second BWP.

According to this aspect, in some embodiments, the switching is responsive to an indication of SS configuration received from the network node 16. In some embodiments, the switching is responsive to expiry of a timer. In some embodiments, when the WD 22 is in the sparse SS configuration, the WD 22 enters a sleep mode, a duration of sleep in the sleep mode being based on a gap between SS search occasions. In some embodiments, a level of sleep of the sleep mode is based on a frequency of SS search occasions. In some embodiments, the processing circuitry 84 is further configured to determine with a specified reliability when a downlink control information, DCI, indicating a BWP change is missed, and to switch between a sparse SS and a dense SS when the DCI indicating a BWP change is determined to be missed. In some embodiments, switching to the sparse SS with first BWP is responsive to not receiving a scheduling PDCCH for a duration of time that exceeds a threshold.

According to another aspect, a method in a wireless device, WD 22, configured to communicate with a network node 16 is provided. The method includes switching via the processing circuitry 84 between a sparse search space, SS, configuration and a dense SS configuration, and monitoring a physical downlink control channel, PDCCH, according to one of the sparse SS in a first bandwidth part, BWP, and the dense SS in a second BWP.

According to this aspect, in some embodiments, the switching is responsive to an indication of SS configuration received from the network node 16. In some embodiments, the switching is responsive to expiry of a timer. In some embodiments, when the WD 22 is in the sparse SS configuration, the WD 22 enters a sleep mode, a duration of sleep in the sleep mode being based on a gap between SS search occasions. In some embodiments, a level of sleep of the sleep mode is based on a frequency of SS search occasions. In some embodiments, the method further includes determining with a specified reliability when a downlink control information, DCI, indicating a BWP change is missed, and to switch between a sparse SS and a dense SS when the DCI indicating a BWP change is determined to be missed. In some embodiments, switching to the sparse SS with first BWP is responsive to not receiving a scheduling PDCCH for a duration of time that exceeds a threshold. According to one aspect, a network node 16 is configured to communicate with a wireless device (WD) and includes processing circuitry configured to determine a sparse search space, SS, configuration based on an acceptable delay value and a bandwidth part, BWP, switching delay value; determine a dense SS configuration based on network resource usage considerations; and configure the WD 22 with a first BWP having a dense SS configuration and a second BWP having a sparse SS configuration.

According to this aspect, in some embodiments, the network node 16 is further configured to signal the WD 22 to switch to the first BWP at a first slot of a data burst scheduled by a downlink control information, DCI, message. In some embodiments, the network node 16 is further configured to signal the WD 22 to switch to the second BWP at one of a last slot and a next-to-last slot of a data burst scheduled by a downlink control information, DCI, message. In some embodiments, the first BWP has a timer to cause the WD 22 to switch to the second BWP after an end of a current data burst.

According to another aspect, a method implemented in a network node 16 includes determining a sparse search space, SS, configuration based on an acceptable delay value and a bandwidth part, BWP, switching delay value; determining a dense SS configuration based on network resource usage considerations; and configuring the WD 22 with a first BWP having a dense SS configuration and a second BWP having a sparse SS configuration.

According to this aspect, in some embodiments, the method includes signaling the WD 22 to switch to the first BWP at a first slot of a data burst scheduled by a downlink control information, DCI, message. In some embodiments, the method includes signaling the WD 22 to switch to the second BWP at one of a last slot and a next-to-last slot of a data burst scheduled by a downlink control information, DCI, message. In some embodiments, the first BWP has a timer to cause the WD 22 to switch to the second BWP after an end of a current data burst.

According to yet another aspect, A WD 22 is configured to communicate with a network node 16, the WD 22 having a radio interface and/or processing circuitry configured to: receive first downlink control information, DCI, from the network node 16 configuring the WD 22 with a first bandwidth part, BWP, having a dense search space, SS, configuration and a second BWP having a sparse SS configuration; receive second DCI configuring the WD 22 to switch from the first BWP to the second BWP; and switch from the first BWP to the second BWP in response to the second DCI.

According to this aspect, in some embodiments, the WD 22 switches from the first BWP to the second BWP in response to expiry of a timer of the first BWP. In some embodiments, the WD 22 is configured by the second DCI to switch from the first BWP to the second BWP in one of a last slot and a next-to-last slot of a data burst scheduled by the DCI.

According to another aspect, a method in a WD 22 includes receiving first downlink control information, DCI, from the network node 16 configuring the WD 22 with a first bandwidth part, BWP, having a dense search space, SS, configuration and a second BWP having a sparse SS configuration. The method includes receiving second DCI configuring the WD 22 to switch from the first BWP to the second BWP; and switching from the first BWP to the second BWP in response to the second DCI.

According to this aspect, the WD 22 switches from the first BWP to the second BWP in response to expiry of a timer of the first BWP. In some embodiments, the WD 22 is configured by the second DCI to switch from the first BWP to the second BWP in one of a last slot and a next-to-last slot of a data burst scheduled by the DCI.

Some embodiments include the following:

Embodiment A1

A network node configured to communicate with a wireless device (WD), the network node configured to, and/or comprising a radio interface and/or comprising processing circuitry configured to:

determine a sparse search space, SS, configuration based on an acceptable delay value and a bandwidth part, BWP, switching delay value;
determine a dense SS configuration based on network resource usage considerations; and
configure the WD with a first BWP having a dense SS configuration and a second BWP having a sparse SS configuration.

Embodiment A2

The network node of Embodiment A1, wherein the network node is further configured to signal the WD to switch to the first BWP at a first slot of a data burst scheduled by a downlink control information, DCI, message.

Embodiment A3

The network node of any of Embodiments A1 and A2, wherein the network node is further configured to signal the WD to switch to the second BWP at one of a last slot and a next-to-last slot of a data burst scheduled by a downlink control information, DCI, message.

Embodiment A4

The network node of any of Embodiments A1 and A2, wherein the first BWP has a timer to cause the WD to switch to the second BWP after an end of a current data burst.

Embodiment B1

A method implemented in a network node, the method comprising:
determining a sparse search space, SS, configuration based on an acceptable delay value and a bandwidth part, BWP, switching delay value;
determining a dense SS configuration based on network resource usage considerations; and
configuring the WD with a first BWP having a dense SS configuration and a second BWP having a sparse SS configuration.

Embodiment B2

The method of Embodiment B1, further comprising signaling the WD to switch to the first BWP at a first slot of a data burst scheduled by a downlink control information, DCI, message.

Embodiment B3

The method of any of Embodiments B1 and B2, further comprising signaling the WD to switch to the second BWP at one of a last slot and a next-to-last slot of a data burst scheduled by a downlink control information, DCI, message.

Embodiment B4

The method of any of Embodiments B1 and B2, wherein the first BWP has a timer to cause the WD to switch to the second BWP after an end of a current data burst.

Embodiment C1

A wireless device, WD, configured to communicate with a network node, the WD configured to, and/or comprising a radio interface and/or processing circuitry configured to:
receive first downlink control information, DCI, from the network node configuring the WD with a first bandwidth part, BWP, having a dense search space, SS, configuration and a second BWP having a sparse SS configuration;
receive second DCI configuring the WD to switch from the first BWP to the second BWP; and
switch from the first BWP to the second BWP in response to the second DCI.

Embodiment C2

The WD of Embodiment C1, wherein the WD switches from the first BWP to the second BWP in response to expiry of a timer of the first BWP.

Embodiment C3

The WD of Embodiment C1, wherein the WD is configured by the second DCI to switch from the first BWP to the second BWP in one of a last slot and a next-to-last slot of a data burst scheduled by the DCI.

Embodiment D1

A method implemented in a wireless device (WD), the method comprising:
receiving first downlink control information, DCI, from the network node configuring the WD with a first bandwidth part, BWP, having a dense search space, SS, configuration and a second BWP having a sparse SS configuration;
receiving second DCI configuring the WD to switch from the first BWP to the second BWP; and
switching from the first BWP to the second BWP in response to the second DCI.

Embodiment D2

The method of Embodiment D1, further comprising the switching from the first BWP to the second BWP in response to expiry of a timer of the first BWP.

Embodiment D3

The method of Embodiment D1, further comprising configuring in response to the second DCI to switch from the first BWP to the second BWP in one of a last slot and a next-to-last slot of a data burst scheduled by the DCI.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node configured to communicate with a wireless device (WD), the network node comprising:
processing circuitry configured to:
determine a sparse search space (SS) configuration of the WD to monitor a physical downlink control channel (PDCCH) in a sparse SS in a first bandwidth part (BWP);
determine a dense SS configuration of the WD to monitor the PDCCH in a dense SS in a second BWP; and
select one of the determined sparse SS configuration and the determined dense SS configuration; and
a radio interface in communication with the processing circuitry, the transceiver configured to:
transmit to the WD an indication of the selected SS configuration to be configured by the WD, a bandwidth, center frequency and number of layers of transmission from the network node to the WD remaining unchanged by a change in search space configuration of the WD.

2. The network node of claim 1, wherein, when the indication indicates the dense SS and second BWP, the indication is transmitted in a first scheduling DCI of a next data burst.

3. The network node of claim 1, wherein the radio interface is further configured to receive a data delay indication from the WD, the data delay indication indicating a delay that is acceptable to the WD, and wherein a duty cycle of the sparse SS is based at least in part on the indicated data delay.

4. The network node of claim 3, wherein the duty cycle of the sparse SS is determined so that an aggregate time of switching between a dense and sparse SS and a gap between polling the PDCCH by the WD does not exceed the indicated data delay.

5. The network node of claim 1, wherein a duty cycle of the sparse SS is based at least in part on a quality of service (QOS) to be provided to the WD by the network node.

6. The network node of claim 1, wherein the indication is transmitted by radio resource control (RRC) reconfiguration signaling.

7. The network node of claim 1, wherein the sparse SS and the dense SS overlap.

8. The network node of claim 1, wherein the dense SS configuration is determined based at least in part on network resource usage.

9. The network node of claim 1, wherein the radio interface is further configured to transmit to the WD an indication to reconfigure a SS configuration responsive to expiry of a timer.

10. A method in a network node configured to communicate with a wireless device (WD), the method comprising:

determining a sparse search space (SS) configuration of the WD to monitor a physical downlink control channel (PDCCH) in a sparse SS in a first bandwidth part (BWP);

determining a dense SS configuration of the WD to monitor the PDCCH in a dense SS in a second BWP;

selecting one of the determined sparse SS configuration and the determined dense SS configuration; and transmitting to the WD an indication of the selected SS configuration to be configured by the WD, a bandwidth, center frequency and number of layers of transmission from the network node to the WD remaining unchanged by a change in search space configuration of the WD.

11. A wireless device (WD) configured to communicate with a network node, the WD comprising processing circuitry configured to:

receive from the network node an indication of the selected SS configuration to be configured by the WD, a bandwidth, center frequency and number of layers of transmission from the network node to the WD remaining unchanged by a change in search space configuration of the WD;

switch between a sparse search space (SS) configuration and a dense SS configuration; and monitor a physical downlink control channel (PDCCH) according to one of the sparse SS in a first bandwidth part (BWP) and the dense SS in a second BWP.

12. The WD of claim 11, wherein the switching is responsive to an indication of SS configuration received from the network node.

13. The WD of claim 11, wherein the switching is responsive to expiry of a timer.

14. The WD of claim 11, wherein, when the WD is in the sparse SS configuration, the WD enters a sleep mode, a duration of sleep in the sleep mode being based on a gap between SS search occasions.

15. The WD of claim 14, wherein a level of sleep of the sleep mode is based on a frequency of SS search occasions.

16. The WD of claim 11, wherein the processing circuitry is further configured to determine with a specified reliability when a DCI indicating a BWP change is missed, and to switch between a sparse SS and a dense SS when the DCI indicating the BWP change is determined to be missed.

17. The WD of claim 11, wherein switching to the sparse SS with first BWP is responsive to not receiving a scheduling PDCCH for a duration of time that exceeds a threshold.

18. A method in a wireless device (WD) configured to communicate with a network node, the method comprising:

receiving from the network node an indication of the selected SS configuration to be configured by the WD, a bandwidth, center frequency and number of layers of transmission from the network node to the WD remaining unchanged by a change in search space configuration of the WD;

switching between a sparse search space (SS) configuration and a dense SS configuration; and monitoring a physical downlink control channel (PDCCH) according to one of the sparse SS in a first bandwidth part (BWP) and the dense SS in a second BWP.

* * * * *